P. J. NOLAN.
TIRE TOOL.
APPLICATION FILED AUG. 15, 1910.
1,009,781.
Patented Nov. 28, 1911.
2 SHEETS—SHEET 2.
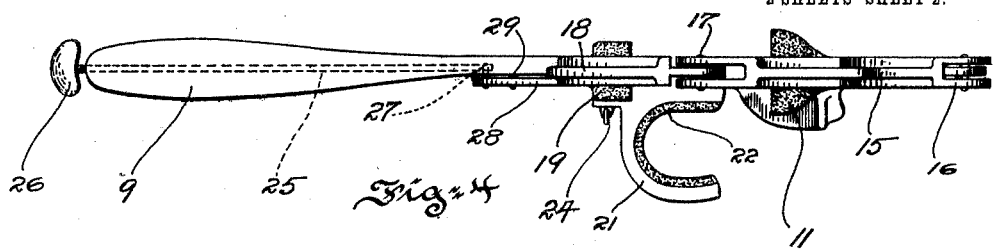
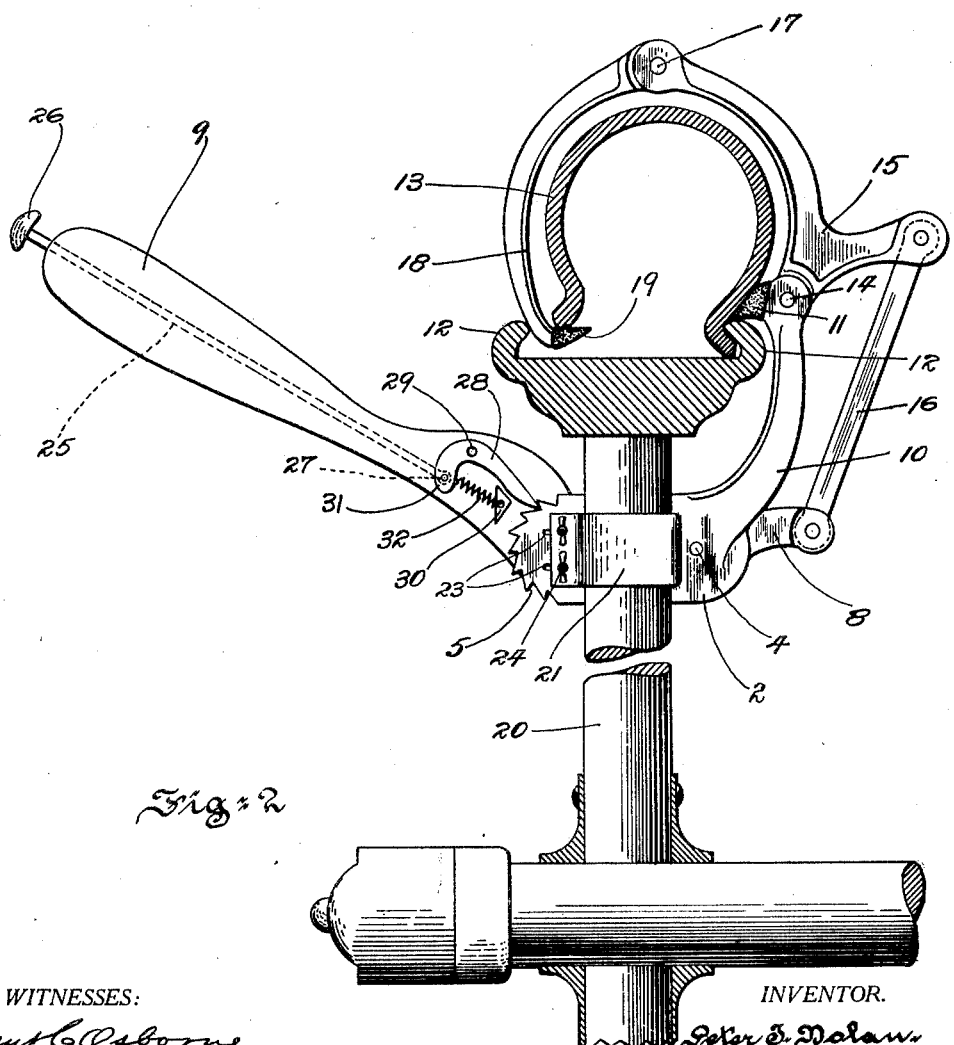
WITNESSES:
Grant C. Osborne
Agnes E. Caskey
INVENTOR.
Peter J. Nolan.
BY
William B. Jackson
ATTORNEY.

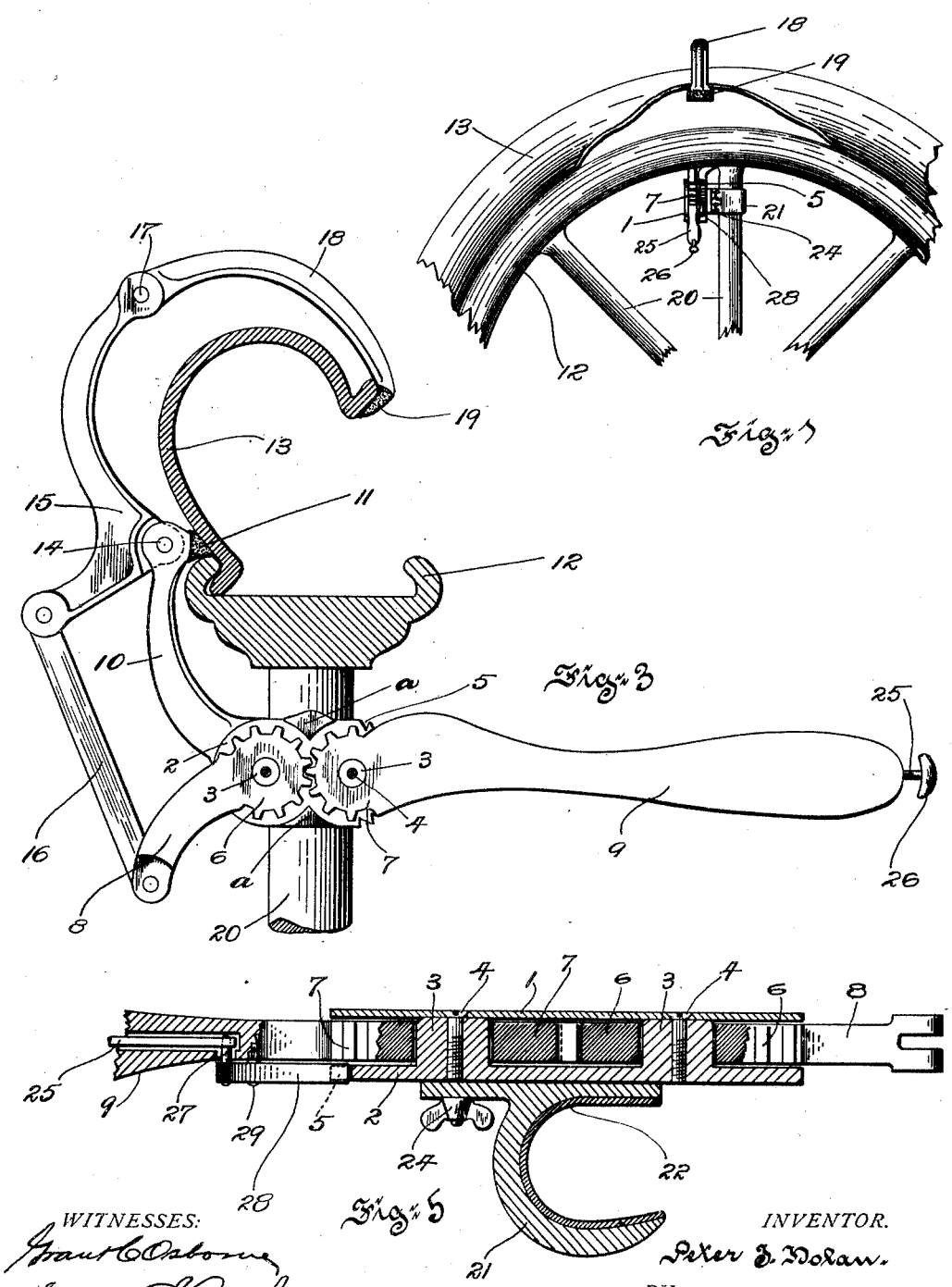

UNITED STATES PATENT OFFICE.

PETER J. NOLAN, OF CHESTER, PENNSYLVANIA.

TIRE-TOOL.

1,009,781.

Specification of Letters Patent.

Patented Nov. 28, 1911.

Application filed August 15, 1910. Serial No. 577,338.

*To all whom it may concern:*

Be it known that I, PETER J. NOLAN, a citizen of the United States, residing in Chester, in the county of Delaware and State of Pennsylvania, have invented certain new and useful Improvements in Tire-Tools, of which the following is a specification.

As ordinarily practiced, the repair of an automobile tire is a tedious and trying experience, due principally to the fact that when the shoe is pried open one person must hold the shoe in open position, while another person patches the inner tube. Likewise, if it be desired to remove the inner tube the same conditions exist.

The principal object of the present invention is to overcome the above recited disadvantageous features and to provide a device of the character indicated that is simple in construction, efficient in use, and comparatively inexpensive to manufacture, and which may be readily handled by one person, whereby when applied to an automobile wheel may be operated to lift a portion of the rim of the shoe of the tire in order that access may be had to the inner tube thereof for repair work thereon, or for removing the tube from the shoe.

A further object of the present invention is to provide a compact device of the character indicated which may be readily carried in the tool-box of an automobile.

Other objects of the invention relate to the providing of general details of construction and arrangement of parts as will more fully hereinafter appear.

The invention consists of the improvements hereinafter described and finally claimed.

The nature, characteristic features and scope of the invention will be more fully understood from the following description taken in connection with the accompanying drawings forming part hereof and in which:

Figure 1, is a fragmentary view of an automobile wheel illustrating a device of the invention as applied to the wheel and showing the position of the shoe after being operated upon, Fig. 2, is a similar view, partly sectioned of an automobile wheel, illustrating a device of the invention as applied to the wheel and ready for use, Fig. 3, is a similar view partly sectioned illustrating the position of the shoe after being operated upon, Fig. 4, is a top or plan view of the device of the invention, and Fig. 5, is a fragmentary view in plan principally in section and drawn to an enlarged scale of the body portion of the device.

Referring to the drawings there is disclosed what may be termed a body portion consisting of a pair of plates 1, and 2, see Fig. 5, suitably spaced by means of lugs *a*, shown as being formed integral with the plate 2, see Fig. 3. The ends of the respective plates may be formed upon arcs of circles. The plate 2, has preferably formed integral therewith a pair of studs 3, apertured for the passage therethrough of screws 4, which secure the respective plates together, the plate 1, being counter-sunk to receive the heads of the screws 4. One end of the plate 2, is serrated or notched as at 5, see Figs. 2, and 5, for a purpose to be presently described. Rotatably mounted upon the studs 3, and between the adjacent plates are toothed segments, meshing one with another, 6, and 7, see Figs. 3, and 5, of which the segment 6, terminates in a generally curved arm 8, and of which the segment 7, terminates in an operating handle 9. Having fixed relation with the plate 2, and rising upwardly therefrom is a generally curved arm 10, terminating in a claw having a rubber facing 11. The rubber facing 11, serves to prevent abrasion of the wheel rim 12, and the face of the tire shoe 13, against which said claw is adapted to abut. Having pivotal relation as at 14, with the arm 10, is a somewhat forked member 15, of which one fork is comparatively longer than the other. Pivotally connecting the shorter extension of the member 15, and the arm 8, of the segment 6, is a link 16. Having pivotal connection as at 17, with the longer extension of the member 15, is a finger piece 18, terminating in a claw faced with rubber or the like 19.

In practice the above-described parts are operatively fixed with respect to one of the spokes 20, of an automobile wheel, by means of a socket-like device 21 which is adjustably mounted with respect to the plate 2. This socket 21, is fixed upon its inner side by means of rubber or the like 22, to prevent abrasion of the spokes 20. As shown in Fig. 2, the plate 2, is slotted as at 23, and the clamp 21, is provided with thumb nuts or the like 24, whereby the said socket may be adjusted laterally when desired.

To permit of the operating of the various above described parts and locking the same to place, use is made of a detent carried by the handle 9, a description of which will now be given.

As clearly illustrated in the drawings, the handle 9, is centrally apertured to receive a shiftable stem 25, provided with a head 26, which normally extends beyond the end of the handle 9. The inner end of the stem 25, has pivotal relation as at 27, with a detent 28, fulcrumed as at 29, to the handle 9. This detent 28, normally engages the serrated edge 5, of the plate 2, for locking the parts together. A stop 30, is present upon the handle 9, for limiting the downward movement of the detent 28. Connecting the end 31, of the detent 28, and the stop 30, is a spring 32, for normally keeping the parts in the position shown in Fig. 2, of the drawings.

A description will now be given of the manner of operating the above described device.

Upon it becoming necessary to repair or remove the inner tube of an automobile tire, the socket 21, of the device is fitted over a spoke 20, of the automobile wheel, see Fig. 2, so that the handle 9, extends outwardly from the machine, and substantially in the position shown in said figure the claw of the arm 10, abutting against the upper portion of the rim 12, and the claw of the finger piece 18, being forced under the edge of the shoe of the tire. The operator now pushes in the head 26, of the stem 25, thereby releasing the detent 28, from the serrated portion 5, of the plate 2, thus permitting the operator to push downward the handle 9, from the position shown in Fig. 2, of the drawings to that shown in Fig. 3. This movement causes the meshing segments through the instrumentality of the arm 8, link 16, member 15, and finger-piece 18, to draw upward the shoe rim to the position in Figs. 1, and 3, of the drawings. Upon reaching this position the spring controlled detent 28, locks the parts in this position thereby permitting the operator to readily have access to the inner tube for repair purposes or for removing the inner tube. In this connection, it may be remarked that the present device provides an attachment by which one person may readily and conveniently pry open the shoe, remove, insert, or patch the inner tube, it being understood that by the present device the parts are positively held so that the shoe is in open position during the entire operation of repair. Further, it may be here remarked that the pivotal point 17, of the device is arranged so that when the parts are applied to a vehicle wheel, and said pivotal point is to one side or in other words off the center of a verticle line drawn through the spokes 20.

What I claim is:

1. A device of the class recited comprising an element provided with members for engaging wheel spoke and rim parts said element having relatively fixed relation with said parts and serving as a fulcrum for the movement of an operating handle, a jaw capable of encircling and engaging the rim of a tire shoe having hinged relation with said element, an operating handle pivotally supported by said element and serving as a lever for controlling said jaw and means operatively connected between said jaw and said handle for moving the jaw about its hinged point.

2. A device of the class recited comprising an element provided with members for engaging wheel spoke and rim parts said element having relatively fixed relation with said parts and serving as a fulcrum for the movement of an operating handle, a jaw capable of encircling and engaging the rim of a tire shoe having hinged relation with said element, an operating handle pivotally supported by said element and serving as a lever for controlling said jaw, means operatively connected between said jaw and said handle for moving the said jaw about its hinged point and mechanism operatively arranged between said element and the operating handle for retaining said jaw in relatively locked position.

3. A device of the class recited comprising an element provided with members for engaging spoke and rim parts said element having relatively fixed relation with said parts and serving as a fulcrum for the movement of an operating handle, a generally forked member having hinged relation with said element, a jaw pivotally carried by one extension of the forked member and adapted to engage the rim of a tire shoe, an operating handle pivotally supported by said element and serving as a lever for controlling said jaw and means operatively connected between the other extension of said forked member and said operating handle for moving the forked member including its jaw around the said hinged point.

4. A device of the class recited comprising an element provided with members for engaging spoke and rim parts said element having relatively fixed relation with said parts and serving as a fulcrum for the movement of an operating handle, a generally forked member having hinged relation with said element, a jaw pivotally carried by one extension of the forked member and adapted to engage the rim of a tire shoe, an operating handle pivotally supported by said element and serving as a lever for controlling said jaw, means operatively connected between the other extension of said forked member and said operating handle for moving the forked member including its jaw around the said hinged point, and mechanism operatively arranged between said element and said operating handle for retaining said forked member including its jaw in relatively locked position.

5. A device of the class recited comprising a body portion consisting of spaced plates, toothed segments journaled between said plates, a socket for engaging the spoke of a wheel adjustably carried by one of said plates, an arm fixed to one of said plates, equipped with a claw for engaging the rim of a wheel, a movable jaw operatively carried by the fixed arm, a link operatively connected between said jaw and one of said segments and an operating handle carried by the other of said segments.

6. A device of the class recited comprising a body portion provided with members for engaging wheel spoke and rim parts said element having relatively fixed position with said parts and serving as a fulcrum for the movement of an operating handle, a jaw capable of encircling and engaging the shoe rim of a tire having hinged relation with said element, toothed segments journaled with respect to said element, means operatively connecting said element and one of said segments and an operating handle for the other of said segments.

7. A device of the class recited comprising a body portion provided with members for engaging wheel spoke and rim parts said element having relatively fixed position with said parts and serving as a fulcrum for the movement of an operating handle, a jaw capable of encircling and engaging the shoe rim of a tire having hinged relation with said element, toothed segments journaled with respect to said element, means operatively connecting said element and one of said segments, an operating handle for the other of said segments and mechanism operatively arranged between said element and said operating handle for retaining said jaw in relatively locked position.

8. A device of the class recited comprising a fixed element for engaging the spoke and rim of a vehicle wheel, a pair of toothed segments journaled in said fixed element, a movable jaw for engaging the shoe of a tire pivotally connected with said fixed member, link connection between the movable jaw and one of said segments, an operating handle carried by the other of said segments, a detent carried by said handle for engaging a serrated portion of the said fixed element, and a spring controlled rod passing through said handle and connecting with the detent for causing said detent to lock and unlock the said movable parts.

9. A device of the class recited comprising a body portion consisting of spaced plates, toothed segments journaled between said plates, a socket for engaging a spoke of a wheel carried by one of said plates, an arm fixed to the other of said plates equipped with a claw for engaging the rim of a wheel, a jaw having hinged relation with said arm for engaging the rim of a tire shoe, means operatively connecting said jaw and one of said segments and an operating handle carried by the other of said segments.

10. A device of the class recited comprising a body portion consisting of spaced plates, toothed segments journaled between said plates, a socket for engaging a spoke of a wheel carried by one of said plates, an arm fixed to the other of said plates equipped with a claw for engaging the rim of a wheel, a jaw having hinged relation with said arm for engaging the rim of a tire shoe, means operatively connecting said jaw and one of said segments, an operating handle carried by the other of said segments and mechanism operatively arranged between said body portion and said operating handle for retaining said jaw in relatively locked position.

11. A device of the class described comprising an element for engaging with a spoke on one side of a vehicle wheel and with the rim thereof upon the other side of the wheel to fixedly support said element as a fulcrum for the movement of an operating handle, an operating handle pivotally supported by said element and serving as a lever for controlling the movement of a tire engaging jaw, a tire engaging jaw having hinged relation with said element and means operatively connecting said operating handle with said jaw.

12. A device of the class described comprising an element for engaging with a spoke on one side of a vehicle wheel and with the rim thereof upon the other side of the wheel to fixedly support said element as a fulcrum for the movement of an operating handle, an operating handle pivotally supported by said element and serving as a lever for controlling the movement of a tire engaging jaw, a tire engaging jaw having hinged relation with said element, means operatively connecting said operating handle with said jaw and mechanism operatively arranged between said element and said operating handle for retaining said jaw in relatively locked position.

In testimony whereof I have hereunto set my hand.

PETER J. NOLAN.

Witnesses:
WILLIAM J. JACKSON,
AGNES E. CASKEY.

Copies of this patent may be obtained for five cents each, by addressing the "Commissioner of Patents, Washington, D. C."